United States Patent
Kim

(10) Patent No.: US 11,537,513 B2
(45) Date of Patent: Dec. 27, 2022

(54) APPARATUS AND METHOD FOR OPERATING GARBAGE COLLECTION USING HOST IDLE

(71) Applicant: SK hynix Inc., Gyeonggi-do (KR)

(72) Inventor: Se-Hyun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/214,320

(22) Filed: Dec. 10, 2018

(65) Prior Publication Data
US 2019/0179747 A1  Jun. 13, 2019

Related U.S. Application Data

(60) Provisional application No. 62/597,262, filed on Dec. 11, 2017.

(30) Foreign Application Priority Data

Oct. 5, 2018  (KR) ......................... 10-2018-0118917

(51) Int. Cl.
G06F 12/02  (2006.01)
G06F 13/16  (2006.01)

(52) U.S. Cl.
CPC ...... G06F 12/0253 (2013.01); G06F 13/1668 (2013.01); G06F 2212/1044 (2013.01); G06F 2213/0036 (2013.01)

(58) Field of Classification Search
CPC ............. G06F 12/0253; G06F 13/1668; G06F 2212/1044; G06F 2213/0036
See application file for complete search history.

(56) References Cited

U.S. PATENT DOCUMENTS

| | | | | |
|---|---|---|---|---|
| 10,445,229 | B1* | 10/2019 | Kuzmin | G06F 3/0659 |
| 2006/0184719 | A1* | 8/2006 | Sinclair | G06F 3/0607 |
| | | | | 711/103 |
| 2007/0234086 | A1* | 10/2007 | Bernstein | G06F 9/4418 |
| | | | | 713/310 |
| 2010/0223429 | A1* | 9/2010 | Cher | G06F 12/0253 |
| | | | | 711/122 |
| 2012/0151124 | A1* | 6/2012 | Baek | G06F 12/0246 |
| | | | | 711/103 |
| 2012/0159051 | A1* | 6/2012 | Hida | G06F 12/0246 |
| | | | | 711/103 |

(Continued)

FOREIGN PATENT DOCUMENTS

| | | |
|---|---|---|
| CN | 107203337 A | 9/2017 |
| KR | 1020140113212 | 9/2014 |

(Continued)

OTHER PUBLICATIONS

JEDEC Standard No. 220C, Universal Flash Storage (UFS) Version 2.1, JEDEC Solid State Technology Association, Mar. 2016.

(Continued)

*Primary Examiner* — Eric T Oberly
(74) *Attorney, Agent, or Firm* — IP & T Group LLP

(57) ABSTRACT

A memory system includes a memory device suitable for storing data and a controller suitable for determining an operation state of the memory device and carrying out garbage collection to the memory device in response to the operation state. The controller can ignore a first command entered from a host while performing the garbage collection.

20 Claims, 14 Drawing Sheets

(56) References Cited

U.S. PATENT DOCUMENTS

| | | | | |
|---|---|---|---|---|
| 2014/0095775 A1* | 4/2014 | Talagala | .............. | G06F 12/0246 |
| | | | | 711/103 |
| 2015/0169443 A1* | 6/2015 | Lee | .................... | G06F 12/0253 |
| | | | | 711/103 |
| 2017/0109101 A1* | 4/2017 | Hanson | .................. | G06F 3/0616 |
| 2017/0123700 A1* | 5/2017 | Sinha | .................. | G06F 12/0253 |
| 2017/0270042 A1* | 9/2017 | Tseng | .................. | G06F 12/0253 |
| 2017/0300410 A1* | 10/2017 | Zhang | ................. | G06F 12/0253 |
| 2018/0365079 A1* | 12/2018 | Koch | ....................... | G06F 3/061 |

FOREIGN PATENT DOCUMENTS

| | | |
|---|---|---|
| KR | 1020170109607 | 9/2017 |
| KR | 1020180045087 | 5/2018 |

OTHER PUBLICATIONS

Office Action issued by the Chinese Patent Office dated Oct. 11, 2021.

* cited by examiner

FIG. 9

UFS Spec 5467 13.4.4.6.2 Background Operations Status
5468 bBackgroundOpStatus is an attribute defined as follows
5469 • 00h = not required
5470 • 01h = required, not critical
5471 • 02h = required, performance impact
5472 • 03h = critical

| IDN | Size | ATTRIBUTES | | | | | Notes |
|---|---|---|---|---|---|---|---|
| | | Access Property | Size | Type[1] / # Ind.[2] / # Sel.[3] | MDV[4] | Description | |
| 05h | bBackgroundOpStatus | Read only | 1 byte | D | 00h | Background Operations Status Device health status for background operation<br>00h: Not required<br>01h: Required, not critical<br>02h: Required, performance impact<br>03h: critical<br>Others: Reserved | |

FIG. 12A

| Attribute | Value | description | Remark |
|---|---|---|---|
| 12h | 0 | Manual GC Off | Device and Host set |
| | 1 | Manual GC On | Only Host set |
| 13h | 0 | Manual GC Clear (don't need) | Device set the status if M-BC is done or not |
| | 1 | Manual GC is needed | |

FIG. 12B

| 12h | 13h | Decription |
|---|---|---|
| 0 | 0 | MGC isn't needed |
| 0 | 1 | MGC is Needed, MGC start CMD should be issued |
| 1 | 0 | don't care (not happen) |
| 1 | 1 | doing MGC opration |

FIG. 12C

| IDN | Name | Access Property | Size | Type [1] | | MDV [4] | Description | Notes |
|---|---|---|---|---|---|---|---|---|
| | | | | # Ind. [2] | | | | |
| | | | | # Sel. [3] | | | | |
| 12h | Reserved | — | — | — | | — | Reserved for Unified Memory Extension standerd | |
| 13h | Reserved | — | — | — | | — | Reserved for Unified Memory Extension standerd | |

APPARATUS AND METHOD FOR OPERATING GARBAGE COLLECTION USING HOST IDLE

CROSS-REFERENCE TO RELATED APPLICATIONS

This present application claims priority under to U.S. provisional patent application Ser. No. 62/597,262, filed Dec. 11, 2017 and Korean Patent Application No. 10-2018-0118917, filed on Oct. 5, 2018, the entire disclosures of each of which are incorporated herein by reference.

BACKGROUND

1. Field

Exemplary embodiments of the invention relate to a garbage collection (GC) method and apparatus using host's idle status, and more particularly, to a garbage collection method and apparatus capable of ignoring a specific instruction or command entered from a host to keep carrying out the garbage collection.

2. Description of the Related Art

Recently, a paradigm for a computer environment has shifted into ubiquitous computing, which enables a computer system to appear anytime and everywhere. The use of portable electronic devices such as mobile phones, digital cameras, notebook computers and the like could rapidly increase. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. A memory system having such advantages can be applicable to a data storage device, including a USB (Universal Serial Bus) memory device, a memory card having various interfaces, a solid state drive (SSD) or the like.

BRIEF DESCRIPTION OF THE DRAWINGS

The description herein makes reference to the accompanying drawings wherein like reference numerals refer to like parts throughout the several views, and wherein:

FIG. 9 describes a method for transmitting the operating state of the memory device into a host;

FIGS. 12A, 12B, and 12C illustrates a method for transmitting information regarding garbage collection performed in a memory system.

DETAILED DESCRIPTION

Figure 1:
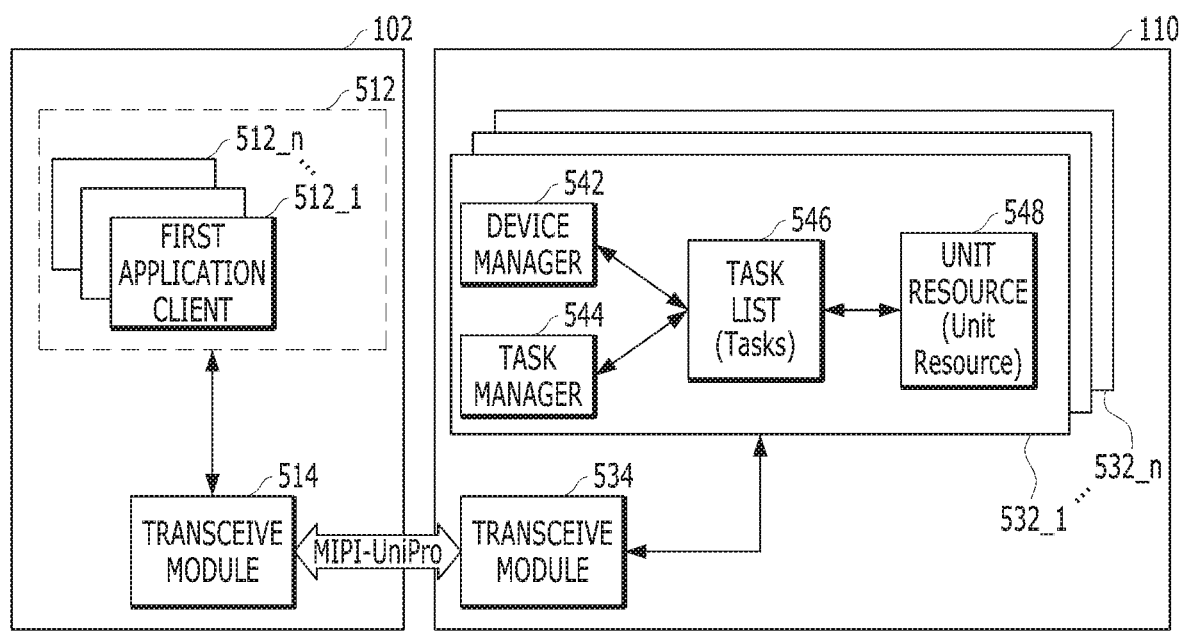
FIG. 1 illustrates a data processing system including a memory system in accordance with an embodiment of the disclosure.

Various examples of the disclosure are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. Throughout the disclosure, like reference numerals refer to like parts throughout the various figures and examples of the disclosure. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure can provide a method and apparatus that can use a host's idle status to secure storage capacity of a memory system, or make the memory system be in a clean state.

Embodiments of the disclosure can recognize an operation state in a memory system interlocked with a host, determine whether a garbage collection (GC) is necessary, and perform an automatic garbage collection without a host command. In the automatic garbage collection, there is provided a method and apparatus for ignoring a specific instruction or command, entered or delivered from a host in order to reduce power consumption, to complete or sufficiently carry out the automatic garbage collection.

In embodiments of the disclosure, a host could know an operation state of a memory device in a memory system engaged with the host and instructs the memory system to perform garbage collection based on the operation state. The memory system may perform a manual garbage collection in response to a host's instruction or command. Herein, the manual garbage collection may be considered a requested garbage collection. In the manual garbage collection, a method and apparatus could ignore a specific instruction, including a command transmitted from a host to reduce power consumption, to achieve or complete the manual garbage collection.

Embodiments of the disclosure also allow a memory system to perform garbage collection in a host's idle state in which the host does not issue or send a command to read or write data from or to the memory system. Embodiments of the disclosure can avoid deteriorating performance of the memory system during the host's idle state.

In an embodiment, a memory system can include a memory device suitable for storing data and a controller suitable for determining an operation state of the memory device and carrying out garbage collection to the memory device in response to the operation state. The controller ignores a first command entered from a host while carrying out the garbage collection.

By the way of example but not limitation, the controller may determine the operation state based on a usage level against a storage capacity of the memory device. Valid data and invalid data can be counted for measuring the usage level. The usage level is determined based on a classified range regarding a ratio of an amount of both valid data and invalid data to the storage capacity.

The classified range can be determined based on the storage capacity. For example, as the memory device has a larger storage capacity, the range may be densely classified (e.g., 10% to 5%, 5% to 3% for each class) or close to full storage capacity (e.g., 80% to 90%, 90% to 95% for a trigger reference).

By the way of example but not limitation, the first command is for reducing power consumption of the memory system. The first command can include a hibernate command or a sleep command issued by a host for reducing power consumption.

In accordance with an embodiment, the controller halts the garbage collection when receiving a second command entered from the host while performing the garbage collection. Herein, the second command is for accessing the memory device. For example, the second command includes a Small Computer System Interface (SCSI) command.

By the way of example but not limitation, the controller transmits information regarding the operating state to the host, receives a third command for performing the garbage collection from the host, and performs the garbage collection in response to the third command.

The controller can transmit information regarding one of at least three statuses regarding the garbage collection to the host. The at least three statuses may include a first status indicating that the garbage collection is not required, a second status indicating that the garbage collection is required, and a third status indicating that the garbage collection is being performed.

In another example, the controller transmits information regarding the operation state to the host and starts the garbage collection without any command entered from the host.

Another embodiment provides a method for operating a memory system, which can include determining an operation state of a memory device suitable for storing data. The method can further include carrying out garbage collection to the memory device in response to the operation state. The carrying out the garbage collection can include ignoring a first command entered from a host while the garbage collection is performed.

By the way of example but not limitation, the first command can include a hibernate command or a sleep command used for reducing power consumption.

The carrying out the garbage collection includes halting the garbage collection when receiving a second command entered from the host while the garbage collection is performed. Herein, the second command is for accessing the memory device. For example, the second command includes a Small Computer System Interface (SCSI) command.

In an example, the method can further include transmitting the operating state to the host, and receiving a third command for performing the garbage collection from the host. The garbage collection may be performed in response to the third command. The transmitting the operating state includes transmitting one of at least three statuses regarding the garbage collection to the host.

By the way of example but not limitation, the at least three statuses may include a first status indicating that the garbage collection is not required, a second status indicating that the garbage collection is required, and a third status indicating that the garbage collection is being performed.

The garbage collection can begin in response to the operation state, regardless of any command entered from the host.

In another embodiment, a system, interlocked with a host and plural memory systems, can be provided. The system can include at least one processor and at least one memory including program instructions. The at least one memory and the program instructions can be configured to, with the at least one processor, cause the system to determine an operation state of a memory device suitable for storing data, carry out garbage collection to the memory device in response to the operation state, and ignore a first command entered from a host while the garbage collection is performed.

For example, the first command can include a hibernate command or a sleep command used for reducing power consumption. The operation state may be determined based on a usage level of total storage capacity of the memory device.

In other embodiments of the disclosure, a memory system can include a controller and a memory device. The memory system can check an operation state of a memory device. Determining whether garbage collection (GC) is required based on the operation state of the memory device, the memory system can transmit information regarding whether the garbage collection (GC) is required to the host. When a host sends a command to allow the memory system to perform a deep GC (enough garbage collection), the memory system can carry out the garbage collection (GC) sufficiently to achieve or acquire a clean state at host's idle time. While the garbage collection is performed, the memory system can ignore a power save command such as a sleep command or a hibernate command. Power saving operations of the memory system can be ignored from a moment when a host command related to garbage collection is entered from the host.

In an embodiment, a memory system can include a memory device including memory blocks; and a controller suitable for controlling the memory device to perform a garbage collection operation to the memory blocks when an amount of data stored in the memory blocks reaches near entire storage capacity of the memory blocks. The controller may control the memory device to complete the garbage collection operation except for access to one or more of the memory blocks in response to an external request.

Hereinafter, embodiments of the disclosure will be described in detail with reference to the accompanied drawings.

Referring to FIG. 1, a data processing system can include a memory system 110 in accordance with an embodiment of the disclosure. Specifically, FIG. 1 illustrates operations of the memory system 110 and a host 102, in a logical standpoint.

Referring to FIG. 1, the memory system 110, interlocked with the host 102, may store or output data corresponding to a command entered from the host 102.

The host 102 may include a computing device that is accessible by a user. By the way of example but not limitation, the host 102 can include an operating system, an application processor, or the like embedded in a personal computer, a notebook computer, a mobile phone, or the like.

The host 102 can include at least one application client 512. Herein, the application client 512 may also be referred to as an application program client. The application client 512 can be considered an entity which is capable of issuing or generating small computer system interface (SCSI) commands (e.g., commands which may belong to Universal Flash Storage (UFS) SCSI Command set) and task management function requests in the host 102. The host 102 can generate a plurality of application clients 512 in response to an input delivered from a user for information or services that the host 102 can provide. For example, the application client 512 may include a first application client 512_1 to an $n^{th}$ application client 512_n.

By the way of example but not limitation, the SCSI commands generated by the host can include at least one of FORMAT UNIT, INQUIRY, MODE SELECT, MODE SENSE, PRE-FETCH, READ, READ BUFFER, READ CAPACITY, REPORT LUNS, REQUEST SENSE, SECURITY PROTOCOL IN, SECURITY PROTOCOL OUT, SEND DIAGNOSTIC, START STOP UNIT, SYNCHRONIZE CACHE, TEST UNIT READY, UNMAP, VERIFY, WRITE, WRITE BUFFER, and the like.

The application client 512 can transmit and receive data, commands, and the like through the transceiver (compound of transmitter and receiver) module 514 included in the host 102. The transceiver module 514 can be designed to both transmit and receive data, commands, and the like based on a predetermined protocol. In another example, the transceiver module 514 can support a plurality of protocols in response to a performance demanded by the host 102. For example, if the host 102 includes a mobile device, the transceiver module 514 and a transceiver module 534 in the memory system 110 can be coupled to the Mobile Industry Processor Interface (MIPI-UniPro) which is supportive to exchange data and commands between two transceiver modules.

The memory system 110 may include the transceiver module 534 for interworking with the host 102 and a plurality of logical units 532_1, . . . , 532_m. Here, a logical unit (LU) can be an externally addressable, independent, processing entity that processes SCSI tasks (commands) and performs task management functions. The logical unit (LU) can independently perform functions of performing internal operations (tasks) corresponding to a SCSI command and managing internal operations. Each logical unit is independent of other logical units in the memory system 100. For example, a logical unit (LU) such as the application client 512 of the host 102 can include an internal entity of a bus device that performs a certain function or addresses a specific space or configuration within a bus device. The logical units (LUs) can be used to store a boot code, an application code, and mass storage data applications. A command assigned to a specific logical unit (LU) in the memory system 110 may be processed exclusively by the corresponding logical unit, and may not be processed by another logical unit.

Each of the logical units 532_1, . . . , 532_m includes a device manager 542 as a conceptual entity in a logical unit that processes small computer system interface (SCSI) commands, a task manager 544 as a conceptual entity in the logical unit that controls the sequencing of commands and performs task management functions, and a task list (tasks) 546 which includes conceptual groups of lists, queues, etc., that include one or more commands.

A task being processed within the memory system 110 may be caused or generated by a small computer system interface (SCSI) command that includes all transactions to complete all data transfers and a status response that will satisfy requirements of requested services corresponding to the command. For example, a task may include a command or series of actions for performing the requested service. Thus, one logical unit (LU) may include a task list 546 that would support or check the processing of one or more tasks.

The task list 546 may have a data structure such as a queue. The task list 546 can be managed by the logical unit (LU).

Engagement between the host 102 and the memory system 110 can be understood as transactions between a client and a server. A transaction between a client and a server may be represented a procedure call with inputs supplied by the application client 512 in the host 102 that works as an initiator device. After the procedure call is processed by the memory system 110 operating as a server, the memory system 110 may return results, outputs or a procedure call status to the host 102. Client-server transactions can be not symmetrical. For example, the host 102 as a client may only originate requests for service while the memory system 110 as a server only responds to such requests.

A service request of the host 102 can be delivered into each logical unit (LU) in the memory system 110. Each logical unit (LU) can receive and process commands or requests entered from the host 102. Although not shown, a logical unit number (LUN) can be assigned to each logical unit (LU), e.g., each Logical Unit has an address within a target device called a Logical Unit Number (LUN), so that the host 102 can access each logical unit (LU) in the memory system 110 via a logical unit number (LUN) and handles each logical unit (LU) independently. For example, the host system 102 and each logical unit (LU) in the memory system 110 can exchange information, status, and the like with each other via a message containing a logical unit number (LUN).

Communication between the host 102 and the memory system 110 can be achieved by a series of messages. For example, the series of messages can be formatted into UFS Protocol Information Units (UPIU). The UPIU structured message can contain a common header area at the beginning of the data structure (the lowest address) and other remaining fields of the data structure which can be varied according to the type of UPIU.

As described above, the host 102 may inquire about the operating state of the memory system 110, and the memory system 110 may respond to the inquiry of the host 102. When the host 102 requests a status regarding the storage capacity of the memory system 110, the memory system 110 may notify the host 102 of the current status. The host 102 may request or command an operation, such as garbage collection, in response to the current state transmitted from the memory system 110.

Figure 2:
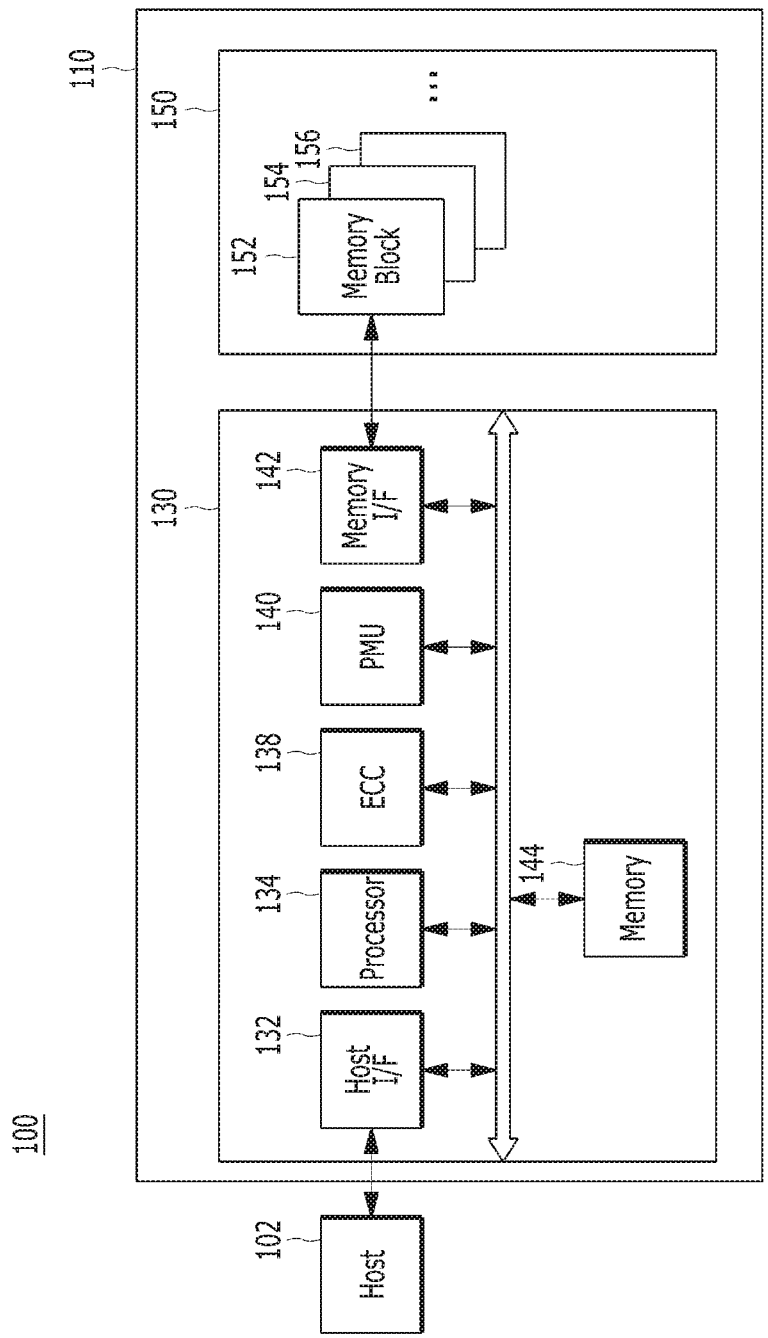
FIG. 2 shows an example of a data processing system including a memory system in accordance with an embodiment of the disclosure.

In FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player and a laptop computer or an electronic device such as a desktop computer, a game player, a television (TV), a projector and the like.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in the various types of memory systems as exemplified above.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152 to 156. Each of the memory blocks 152 to 156 may include a plurality of pages. Each of the plurality of pages may include a plurality of memory cells to which a plurality of word lines (WL) are electrically coupled.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) unit 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE).

The ECC unit 138 may detect and correct errors in the data read from the memory device 150 during the read operation. When the number of the error bits is greater than or equal to a threshold number of correctable error bits, the ECC unit 138 may not correct error bits but may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data required for the controller 130 and the memory device 150 to perform operations.

The memory 144 may be implemented with a volatile memory. The memory 144 may be implemented with a static random access memory (SRAM), a dynamic random access memory (DRAM) or both. Although FIG. 1 exemplifies the memory 144 disposed within the controller 130, the embodiment is not limited thereto. That is, the memory 144 may be located inside or outside the controller 130. For instance, the memory 144 may be embodied by an external volatile memory having a memory interface transferring data and/or signals transferred between the memory 144 and the controller 130.

The processor 134 may control the overall operations of the memory system 110. The processor 134 may use or execute a firmware to control the overall operations of the memory system 110. The firmware may be referred to as a flash translation layer (FTL).

An FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 100. Accordingly, reliable bad block management may be required.

Figure 3:
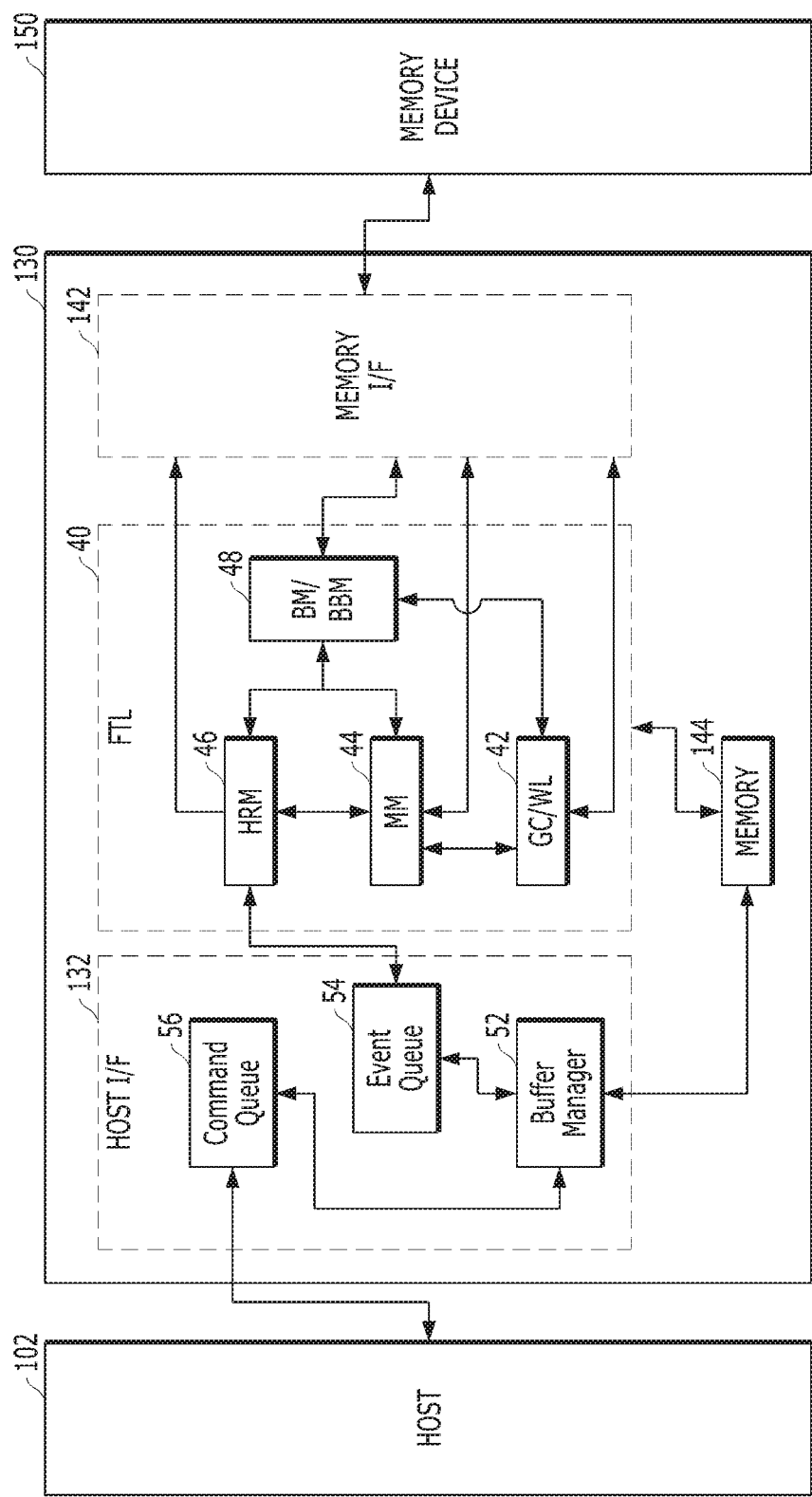
FIG. 3 describes a controller in a memory system in accordance with an embodiment of the disclosure.

Referring to FIG. 3 the controller 130 in the memory system 110 in accordance with another embodiment of the disclosure is described in detail. The controller 130 cooperates with the host 102 and the memory device 150. The controller 130 can include the host interface unit 132, the flash translation layer (FTL) unit 40, the memory interface unit 142 and the memory 144.

Although not shown in FIG. 3, in accordance with an embodiment, the ECC unit 138 described in FIG. 2 may be included in the flash translation layer (FTL) unit 40. In another embodiment, the ECC unit 138 may be implemented as a separate module, a circuit, a firmware or the like, which is included in, or associated with, the controller 130.

The host interface unit 132 is for handling commands, data, and the like, transmitted from the host 102. By the way of example but not limitation, the host interface unit 132 can include a command queue 56, a buffer manager 52 and an event queue 54. The command queue 56 can sequentially store commands, data, and the like transmitted from the host 102 and output them to the buffer manager 52 in a stored order. The buffer manager 52 can classify, manage or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read command) and programming/writing data (write command) may be alternately transmitted to the memory system 110. The host interface unit 132 can store commands, data, and the like, which are transmitted from the host 102, to the command queue 56 sequentially. Thereafter, the host interface unit 132 can estimate or predict what kind of operation the controller 130 will perform according to the characteristics of the command, data, etc., which is transmitted from the host 102. The host interface unit 132 can determine a processing order and a priority of commands, data and the like, based at least on their characteristics. According to characteristics of commands, data, and the like transmitted from the host 102, the buffer manager 52 in the host interface unit 132 is configured to determine whether storing commands, data, and the like in the memory 144, or whether delivering the commands, the data, and the like into the flash translation layer (FTL) unit 40. The event queue 54 receives events, entered from the buffer manager 52, which are to be internally executed and processed by the memory system 110 or the controller 130 in response to the commands, the data, etc. transmitted from the host 102, so as to deliver the events into the flash translation layer (FTL) unit 40 in the order received.

In accordance with an embodiment, the flash translation layer (FTL) unit 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By the way of example but not limitation, the host request manager (HRM) 46 can use the map manager (MM) 44 and the block manager 48 to handle or process requests according to the read and program commands and events which are delivered from the host interface unit 132. The host request manager (HRM) 46 can send an inquiry request to the map data manager (MM) 44, to figure out a physical address corresponding to the logical address which is entered with the events. The host request manager (HRM) 46 can send a read request with the physical address to the memory interface unit 142, to process the read request (handle the events). On the other hand, the host request manager (HRM) 46 can send a program request (write request) to the block manager 48, to program entered data to a specific page of the unrecorded (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface unit 142. The block manager 48 can send several flash program requests to the memory interface unit 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least valid page when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface unit 142 to load a relevant mapping table stored in the memory device 150. When the number of dirty cache blocks in the map manager 44 exceeds a certain threshold, a program request can be sent to the block manager 48 so that a clean cache block is made as well as the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. This is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the block manager 48, the map manager 44, and the state manager 42 which is described in FIG. 3, can include a garbage collection controller 196 described later in FIG. 4.

The memory device 150 can include a plurality of memory blocks. The plurality of memory blocks can be classified into different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity in the same space than the SLC memory block. The MLC memory block can be highly integrated in view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory for example as a flash memory, such as a NAND flash memory, a NOR flash memory and the like. However, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
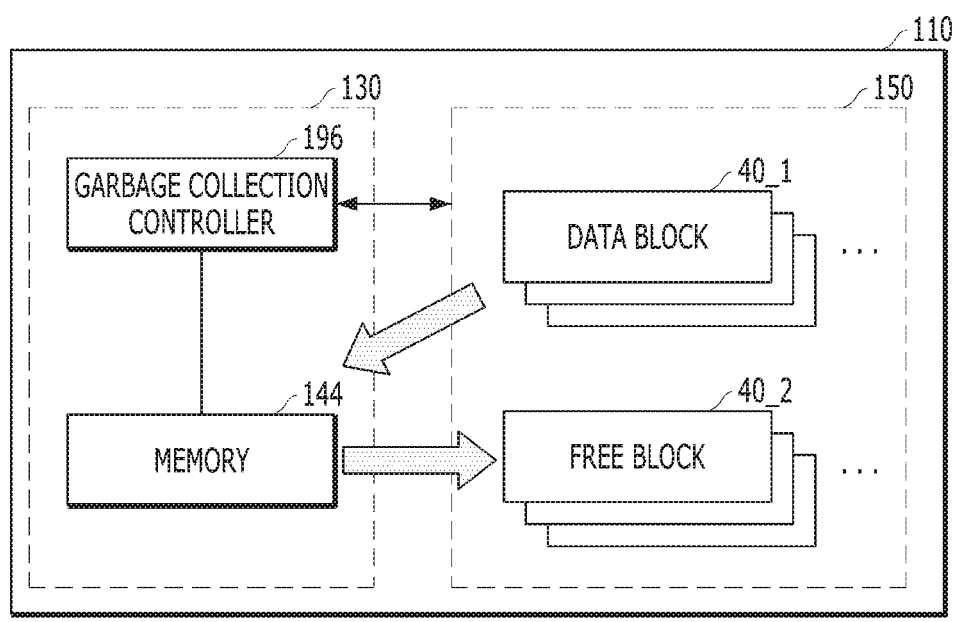
FIG. 4 shows an example of garbage collection.

Referring to FIG. 4, an example of garbage collection is illustrated. An auto garbage collection (GC) can be performed by the memory system 110 without external commands or instructions, e.g., a host's command. A manual garbage collection can be carried out in response to external commands or instructions.

The controller 130 in the memory system 150 can read user data from a plurality of data blocks 40_1 in the memory device 150 and store the user data in the memory 144 included in the controller 130. The user data can be programmed in at least one free block 40_2 by the controller 130. Here, the plurality of data blocks 40_1 may include a closed block that cannot be programmed with data any more. In accordance with an embodiment, the memory 144 may be disposed outside the controller 130 and interlocked with the controller 130.

Specifically, the garbage collection control unit 196 included in the controller 130 can select at least one of the plurality of data blocks 40_1 in the memory device 150 as a target block. The garbage collection control unit 196 can search for and extract valid data in the target block. The garbage collection control unit 196 can copy valid data to the free block 40_2, which is erased and ready to be programmed with data. At this time, data determined to be no longer valid in the target block may be discarded, and may not be copied to the free block 40_2. After all valid data stored in the target block are copied to the free block 40_2, the controller 130 does not consider that the specific data block 40_1 has any more valid data.

Thereafter, when any block to be programmed with new data is required, all the data stored in the target block can be erased to store the new data.

In accordance with an embodiment, the controller 130 may use the memory 144 to temporarily store valid data selected from the target block until the valid data are programmed into the free block 40_2.

For garbage collection, the controller 130 should distinguish valid data from invalid data in a target block. The information on the effective page count (VPC) corresponding to each data block 40_1 can indicate the amount of the valid data or valid pages in each data block 40_1, but may not show which data or which page in each data block 40_1 is valid or not. Therefore, the controller 130 may need to utilize the number of valid pages and operation information including a map data to determine or confirm which data or which page is valid or not. In an embodiment, when a valid data to be stored in the free block 40_2 is easily distinguished for garbage collection, resources (e.g., time and power) required for garbage collection can be reduced.

The plurality of blocks 40_1 and 40_2 in the memory device 150 can store large volume data. In accordance with an embodiment, the controller 130 may divide each block into a plurality of unit blocks in order to more efficiently control and manage the plurality of blocks 40_1 and 40_2 storing large amounts of data. When a single block is divided into a plurality of unit blocks, the controller 130 can generate map data (e.g., L2P table, P2L table or the like) for each unit block.

In accordance with an embodiment, various number of unit blocks may be included in a single block. By the way of example but not limitation, the number of unit blocks included in a single block may depend at least on the structure of the memory device 150, the size of the map data, the location of the map data, or the like. In an embodiment, each block in the memory device 150 can be programmed with data in a single-page unit or a multi-page unit. At this time, the size of data that can be stored in each page could be varied according to the structure of unit cells or cell strings in each block. When a map data is generated in a bitmap format, an area corresponding to one or more times the map data size can be determined as the size of the unit block.

Data can be sequentially programmed from the first page to the last page in the data block 40_1. When data is programmed on the last page of a block, the block is changed from an open state where new data can be programmed to a close state in which the new data can no longer be programmed. In accordance with an embodiment, when a specific block among the data blocks 40_1 becomes a close state, the garbage collection control unit 196 can compare the number of map data regarding the data stored in the unit block of the corresponding block with the number of valid pages to determine the validity of the data stored in the corresponding block.

Specifically, when the data block 40_1 in the memory device is in a state (closed state) in which data can no longer be written without an erase operation, the controller 130 can compare the number of valid pages with the sum of map data for plural unit blocks. If the number of valid pages and the sum of the map data for a specific block are not matched with each other, it could be presumed that the specific block includes some invalid or unnecessary map data. The controller 130 can check whether the map data corresponding to the data stored in the block is valid. When there is map data that is no longer valid, the controller 130 may delete or invalidate invalid map data to update the map data.

In accordance with an embodiment, the garbage collection control unit 196 can determine whether to designate a specific block as a target block for garbage collection based on the ratio of the sum of map data for a plurality of unit blocks in the corresponding block divided by the number of pages in the corresponding block. Herein, the number of pages in a block would be a fixed value determined by circuit design and manufacturing procedures of the memory device 150, which may represent the maximum amount of valid data that can be stored in the block. When a specific block is divided into a plurality of unit blocks and map data are generated for each unit block, the sum of map data for a plurality of unit blocks in the corresponding block can indicate the amount of valid data in the corresponding block. Therefore, the garbage collection control unit 196 can recognize which block stores more valid data than another block, based on the ratio of the sum of the map data for the plurality of unit blocks in one block divided by the number of pages in the corresponding block. As the ratio regarding a block is lower, the garbage collection control unit 196 can prioritize a block having a lower ratio as a target block for garbage collection. In addition, the garbage collection control unit 196 can determine whether to select a block as the target block for the garbage collection through whether the ratio belongs to a predetermined range or is below criteria.

In the embodiments above-described, the controller 130 must search valid data in a target block among a plurality of data blocks 40_1 for garbage collection. At this time, the controller 30 does not search valid data for every data block 40_1 in the memory device 150, but can search valid data only within a predetermined range (e.g., unit block) of each data block 40_1. In this case, it is possible to reduce resources (e.g., time, power or the like) spent and required for searching valid data to be stored in the free block 40_2 during the garbage collection.

The search for valid pages may be relevant to a sub-operation of garbage collection (GC). The search for valid pages and the search for target blocks may be a key factor for managing the consumed time of garbage collection in a memory system. A method and an apparatus for performing the garbage collection would support the search for valid pages and the search for target blocks. Herein, the garbage collection can include an operation for searching for an area (blocks) in which a dynamically allocated memory area is no longer usable or needlessly occupied, and erasing data stored in the corresponding area to prepare for programming new data. The time required to erase data contained in a specific area of a nonvolatile memory device may vary depending on cell structure or cell characteristics of the nonvolatile memory device. On the other hand, the time required to search for an area to be erased in the nonvolatile memory device may vary depending on a method and an apparatus for controlling the nonvolatile memory device in accordance with various embodiments.

Figure 5:
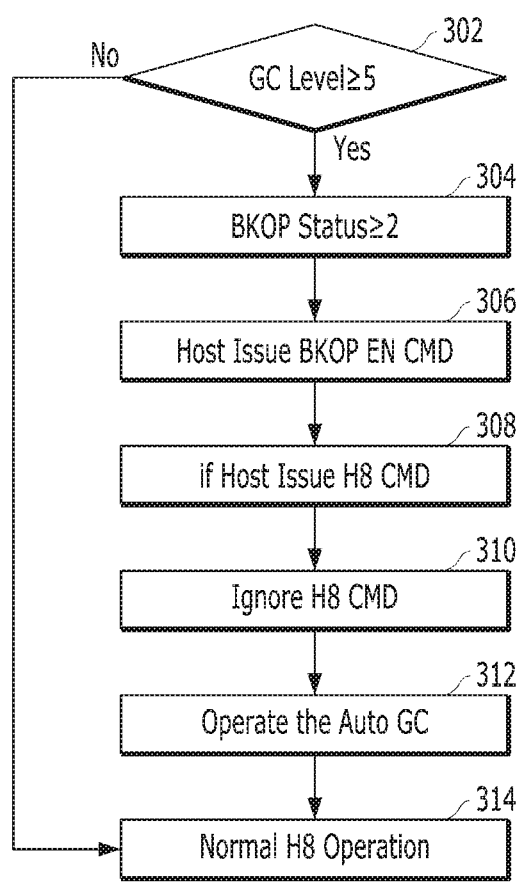
FIG. 5 illustrates a method of performing an automatic garbage collection in accordance with an embodiment of the disclosure.

Referring to FIG. 5, a method of performing an auto garbage collection (Auto GC) in accordance with an embodiment of the disclosure is described herein.

The method for performing automatic garbage collection includes step 302 at which the memory system 110 shown in FIGS. 1 to 4 can check an operating state of the memory device 150 shown in FIGS. 2 to 4. The operating state of the memory device 150 may be represented as a garbage collection level (GC Level) which can be varied from 1 to 6 as described later with reference to FIG. 8. The memory system 110 may determine whether the garbage collection level (GC Level) is higher or lower than a reference (e.g., 5 as exemplified in FIG. 5) for triggering the auto garbage collection. The garbage collection level (GC Level) and the reference are described in more detail in FIG. 8.

When the garbage collection level (GC Level) is less than the reference ("No" in step 302), the memory system 110 can perform a normal power saving operation (i.e., H8 Operation) in step 314. Here, the power save operation (H8 Operation) may be performed corresponding to a hibernate command or a sleep command (e.g., HIBERN8, or H8 command). In the power save operation or a power save mode, the memory system 110 may not carry out the automatic garbage collection (Auto GC). For example, the power saving operation (H8 Operation) can induce the high-impedance (High-Z) at terminals connected to transmission lines in the transceiver modules 514, 534 described in FIG. 1.

When the garbage collection level is equal to or higher than the reference ("Yes" in step 302), the memory system 110 can check a background operation status (BKOP Status) in step 304. The background operation status (BKOP Status) recognized or identified by the memory system 110 may be delivered as a response to an inquiry of the host 102. A detailed description of the background operation status (BKOP Status) will be described later with reference to FIG. 8.

By the way of example but not limitation, when the background operation status (BKOP Status) is greater than or equal to a predetermined reference level (e.g., 2 as exemplified in FIG. 5), the host 102 may generate and provide a background operation enable signal (BKOP EN CMD) to the memory system 110 in step 308. The background operation enable signal (BKOP EN CMD) may be designed to allow the memory system 110 to perform background operations. For example, when the host 102 is in an idle state, the host 102 may generate and issue the background operation enable signal (BKOP EN CMD).

After the memory system 110 receives the background operation enable signal (BKOP EN CMD) issued by the host 102, the host 102 may generate the hibernate command or the sleep command (H8 CMD) for power saving in step 308. The memory system 110 may ignore the hibernate command or the sleep command (H8 CMD) entered from the host 102, after receiving the background operation enable signal (BKOP EN CMD) in step 310).

The host 102 may generate the hibernate command or the sleep command (H8 CMD) after or directly after generating the background operation enable signal (BKOP EN CMD). In the case of a mobile device as the host 102, a first control module or circuit for generating a background operation enable signal (BKOP EN CMD) and a second control module or circuit for generating the hibernate command or the sleep command (H8 CMD) can operate independently. For example, the first control module or circuit may determine whether the host 102 generates the background operation grant signal (BKOP EN CMD), based on a state of operation within the memory system 110. The second control module or circuit may determine whether to generate the hibernate command or the sleep command (H8 CMD) according to an input from the external or the outside (e.g., user's input). Therefore, it may occur that the host 102 sequentially generates the background operation enable signal (BKOP EN CMD), and the hibernate command or the sleep command H8 CMD.

When the memory system 110 performs the power saving operation (H8 Operation) in response to the hibernate command or the sleep command (H8 CMD), i.e., when the memory system 110 operates in a power saving mode, the garbage collection (GC) may not be normally performed. Generally, the power saving operation (H8 Operation) can cut off a power supplied to most components in the memory system 110 and consume the power at minimum to perform only an operation that is required to be ready for a change from the power saving mode into an active mode. Therefore, in the power save operation (H8 Operation), it is not possible to perform a data transfer operation such as moving the data to another location (e.g., free block) like the garbage collection (GC) described in FIG. 4.

In an embodiment, the memory system 110 can ignore the power save operation command (H8 CMD) so that the memory system 110 may keep performing and complete the auto garbage collection Auto (GC) despite the power save operation command (H8 CMD) in step 312.

After completing the auto garbage collection (Auto GC), the memory system 110 can perform the power saving operation (H8 Operation) in response to the power save operation command (H8 CMD) in step 314.

In the above-described method, the memory system 110 can start the auto garbage collection (Auto GC) when the host 102 is in an idle state. The memory system 110 can ignore the hibernate command or the sleep command (H8 CMD) entered from the host 102, which is in the idle state, so as to keep performing the auto garbage collection. When the auto garbage collection (Auto GC) is completed, it is likely that the memory system 110 can secure enough available storage space.

In addition, the memory system 110 may send an operation state of the memory device 150 to the host 120 and ask the host 120 to send an instruction or a command for allowing a garbage collection (GC) when the host 120 is in an idle state. When receiving the corresponding command, the memory system 110 can ignore another command such as a sleep command or a hibernate command to achieve or complete the garbage collection (GC). However, when a command for an operation such as reading or writing data to access the memory device 150 is entered from the host 102 while the memory system is performing the garbage collection (GC), the memory system 110 can immediately stop the garbage collection (GC) in response to the command.

Figure 6:
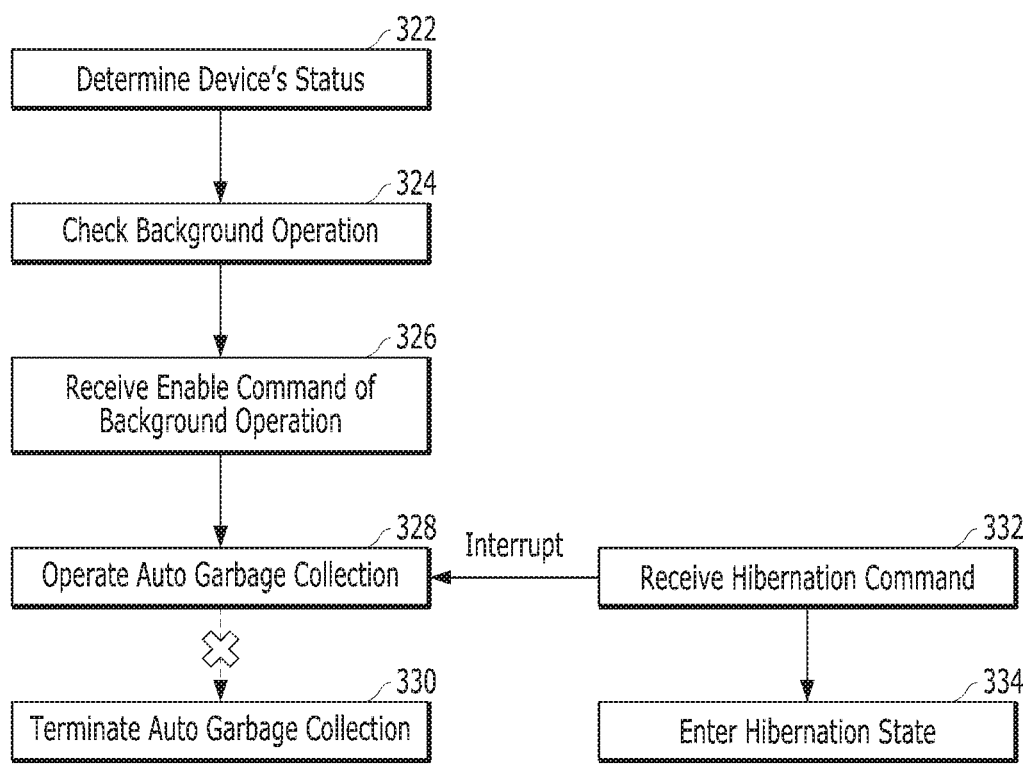
FIG. 6 describes confrontation between automatic garbage collection and power management.

Referring to FIG. 6, there is collision or dissonance between auto garbage collection and power management. FIG. 6 specifically describes the necessity of the method for performing the auto garbage collection (Auto GC), which is described in FIG. 5.

In FIG. 6, a memory system may determine an operating state of a memory device in step 322. When it is determined that the memory system needs to perform garbage collection according to the operation state of the memory device, the background operation can be checked in step 324.

Upon receipt of an instruction or a command to perform a background operation delivered from the host in step 326, the memory system may perform auto garbage collection in step 328.

During the auto garbage collection, the memory system may receive a hibernation command transferred from the host for the power saving operation in step 332. When the hibernation command for the power save operation is transferred, the memory system can be switched to a hibernation state in step 334. At this time, the auto garbage collection performed by the memory system is interrupted by the hibernation command. The memory system may not complete the auto garbage collection due to the fail to perform step 330.

In the case of a portable device, power saving can be a very important item that shows the performance of the portable device. Therefore, a hibernation command for power saving operation generally has a high priority. When user's input does not exist for a predetermined time or when a service requested by the user is not provided, the host may generate a hibernation command for the power saving operation.

Power saving may become an important indicator for performance. When a specific module or circuit does not perform any operation for a very short time (e.g., several ms or several μm), the host could issue a hibernation command. The memory system can be one of destinations to which the host transmits a hibernation command for the power saving operation.

The memory system may perform garbage collection as a background operation while no instruction or command is being entered from the host. However, the host can provide a hibernation command for power saving operation while the memory system performs the garbage collection. Therefore, as described with reference to FIG. 6, even if the memory system determines that garbage collection is necessary, the memory system may not complete or sufficiently perform the garbage collection due to the interrupt by the hibernation command. This situation may cause the performance deterioration of the memory system.

Figure 7:
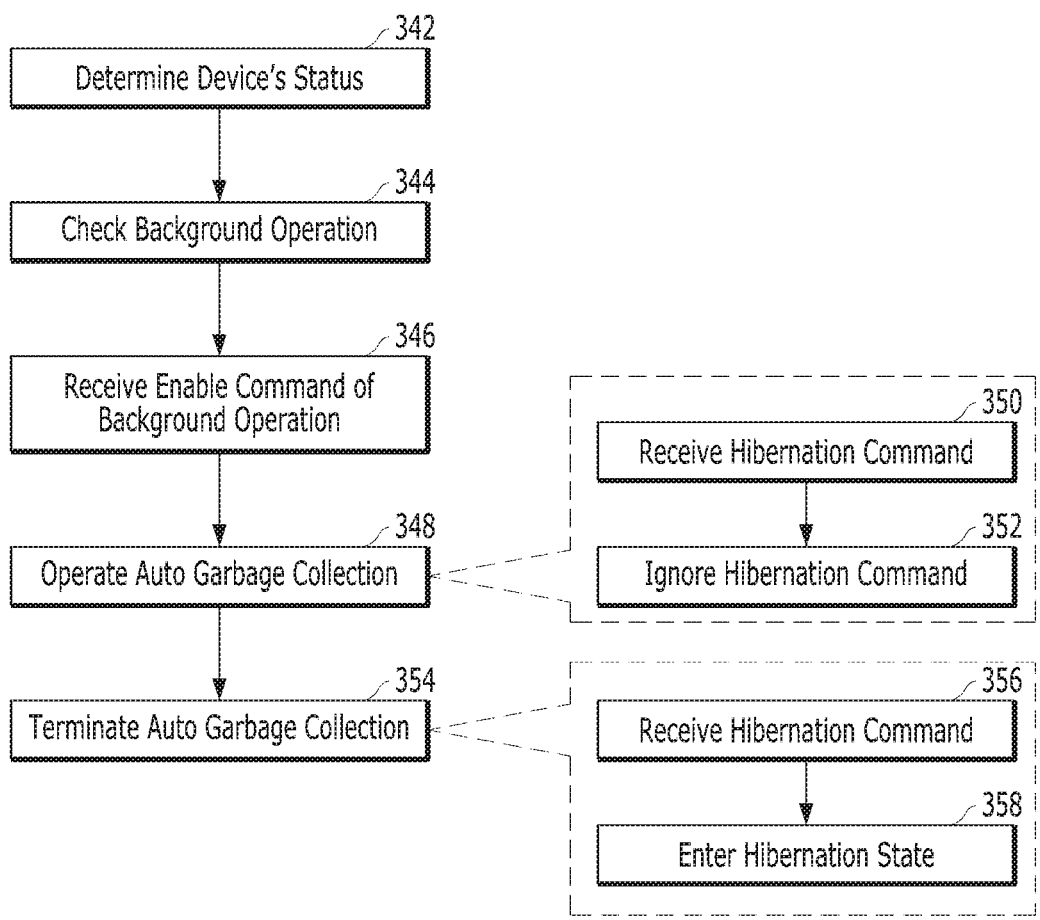
FIG. 7 illustrates a method for performing automatic garbage collection in accordance with an embodiment of the disclosure.

Referring to FIG. 7, a method for performing automatic garbage collection in accordance with another embodiment of the disclosure is described. FIG. 7 illustrates a method for performing the auto garbage collection (Auto GC) described in FIGS. 5 and 6.

In FIG. 7, the memory system may determine an operational state of the memory device in step 342. If it is determined that the memory system needs to perform garbage collection according to the operation state of the memory device, a background operation (BKOP) state can be checked in step 344.

Upon receiving an instruction or a command entered from the host for the memory system to perform a background operation in step 346, the memory system may begin auto garbage collection in step 348. After the memory system completes the auto garbage collection, it may terminate the auto garbage collection in step 354.

While the memory system performs the auto garbage collection in step 348, the memory system may receive a hibernation command for a power saving operation passed from the host in step 350. However, even though receiving the hibernation command during the auto garbage collection, the memory system may ignore the hibernation command for the power saving operation without switching to the power saving operation or a power saving mode corresponding to the hibernation command in step 352. When ignoring the hibernation command for the power save operation, the memory system can continue to perform the auto garbage collection without cessation.

On the other hand, after the memory system completes the automatic garbage collection operation in step 354, the memory system may receive a Hibernation Command for power saving operation transferred from the host in step 356. The memory system may switch to a power saving mode or a power saving mode ("Enter Hibernation State" in FIG. 7) corresponding to the received Hibernation Command in step 358.

Figure 8:
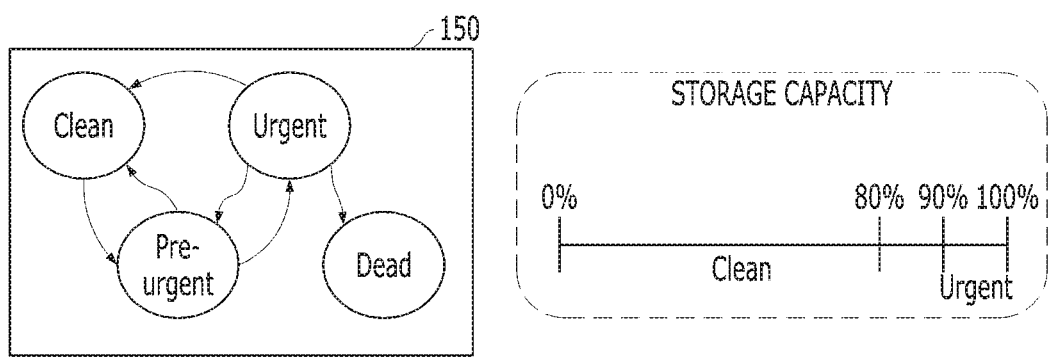
FIG. 8 shows an operation state of a memory device.

In FIG. 8, an operation state of the memory device 150 is described. FIG. 8 can show relevance or a relationship between an operation state of the memory device 150 and a garbage collection described with reference to FIGS. 5 to 7.

Referring to FIG. 8, the memory device 150 can have at least four operation states. Here, the four operation states may include a clean state, a pre-urgent state, an urgent state and a dead state. Depending on an embodiment, the memory device 150 may have three or five operation states. For example, the three operation states may be when there is only one of the pre-urgent state and the urgent state. Further, in five operation states, the dead state can be further subdivided into two different states. The operation state of the memory device can be changed, according to the design of the memory device or the request of the host interlocking with the memory system.

The four operation states of the memory device 150 may depend on a size of available storage space in the memory device 150. For example, the operation state could be a clean state until data is stored up to 80% of the entire storage capacity of the memory device 150. When data occupies 80% to 90% of the entire storage capacity, the operation state could become the pre-urgent state. The memory device 150 might be in an urgent state when data is stored in 90% to 100% of the entire storage capacity, while being in a dead state when data occupies 100% of the entire storage capacity. The operation state of the memory device 150 may be determined at a predetermined ratio of data usage throughout the storage capacity, but the predetermined ratio may be changed according to the design of the memory device or the request of the host engaged with the memory system.

The operation state can be determined to be in a clean state until data are stored in 0% to 80% of the entire storage capacity of the memory device 150. In the clean state, data can be written up to 80% of the entire storage capacity. However, all of the data written in the space of 80% might be not valid. Since the memory device 150 including non-volatile memory cells has a finite lifetime, the data written to the non-volatile memory cell may not be immediately deleted even if it becomes no longer valid. This is because the life of the memory device 150 is reduced as the operation of writing and erasing data in the nonvolatile memory cell is repeated. Thus, in the clean state, the data already stored in the memory device 150 can be left without being erased or deleted even if it is no longer valid.

When the recorded data including valid data and invalid data occupy 80% or over and less than 90% of the entire storage capacity of the memory device 150, the operation state is set to a pre-urgent state. It is possible to perform garbage collection on the memory device 150 in the pre-urgent state to erase the invalid data. When the invalid data is deleted so that an available storage space increases, the memory device 150 may be shifted or changed from the pre-urgent state to the clean state.

When written data including valid data and invalid data occupy 90% or over and less than 100% of the entire storage capacity of the memory device 150, the operation state can be determined to be an urgent state. In the urgent state, unlike the pre-urgent state, the memory device 150 could reach the dead state in the not-too-distant future if garbage collection is not performed. When the garbage collection could be performed in the urgent state, the operation state of the memory device 150 can be switched to the clean state. However, the memory device 150 could be switched to the pre-urgent state or have stayed in the urgent state if the garbage collection is not performed.

When stored data including valid data and invalid data occupy 100% of the entire storage capacity of the memory device 150, the operation state may be determined as a dead state. In the dead state, the memory device 150 cannot write or program new data without performing an erase operation on at least one block in the memory device 150. However, it is difficult for the memory device 150 to perform the garbage collection in the dead state since it may not secure a free block. In accordance with an embodiment, the memory 144 included in the controller 130 may be used for the garbage collection when the memory device 150 is in the dead state.

Preferably, the memory system 150 should be able to perform the garbage collection before the memory device 150 reaches the dead state. In an embodiment, enough free blocks might be required to perform the garbage collection in a fast and smooth manner, so that performing the garbage collection can be more effective in the pre-urgent state than in the urgent state.

Referring to FIG. 8, the clean state, pre-urgent state, and urgent state of the memory device 150 may correspond to a garbage collection level (GC Level) of values from '1' to '6'. In accordance with an embodiment, the garbage collection level (GC Level) may be divided into six levels. However, the garbage collection level (GC Level) may vary depending on the design of the memory device 150 or the requirements of the host 102 interlocking with the memory system 110.

The garbage collection level (GC Level) can be classified based on features such as a background operation (BKOP Status), a host involvement, a hibernation operation (e.g., H8 Action after BKOP), and an estimation time for completing garbage collection.

In an embodiment, depending on the garbage collection level (GC Level) corresponding to the operations state of the memory device 150, sleep or hibernation operation (H8 Action) may be performed or not while a background operation (BKOP) is being performed. In FIG. 8, at the first to third levels (GC Levels 1 to 3) among the garbage collection levels (GC Levels), when garbage collection is performed as a background operation BKOP, a power saving operation (H8 Action) may be performed in response to a sleep or hibernation command for a power saving operation. However, at the fourth to sixth levels (GC Levels 4 to 6) among the garbage collection levels (GC Levels), while the garbage collection is performed as the background operation (BKOP), the power saving operation (H8 Action) corresponding to the hibernation command for the power saving operation transmitted from the host 102 is not performed. The hibernation command can be ignored.

In accordance with an embodiment, the memory system 110 can provide the host 102 with a status of a manual garbage collection Requested (GC) that is performed in response to an instruction or a command entered from the host 102. The status of manual garbage collection Requested (GC) will be described later with reference to FIGS. 10 to 12.

Referring to FIG. 8, the host 120 may enable a background operation enable signal BKOP CMD at a fifth level (GC Level 5) among the garbage collection levels (GC Levels) and the memory system 110 may start or perform the auto garbage collection (Auto GC) in response to the background operation enable signal (BKOP CMD). In accordance with an embodiment, the host 102 may enable the background operation enable signal (BKOP CMD) even at the third and fourth levels (GC Levels 3 and 4) among the garbage collection levels (GC Levels).

Referring to FIG. 9, how to transfer the operating state of the memory device to the host is described. Specifically, FIG. 9 illustrates a memory system's operation method for transferring, to the host, information regarding the background operation state corresponding to the operation state of the memory device described in FIG. 8.

Referring to FIG. 9, the standard of the Joint Electron for Devices Engineering Council (JEDEC), for describing Universal Flash Storage (UFS), describes a method or a protocol relevant to how a host can recognize whether a memory system is required to perform a background operation.

In the standard, a host that is associated with a memory system can send an inquiry to the memory system, and the memory system can respond to the host's inquiry in a predetermined format (bBackgroundOpStatus). The response of the memory system can be roughly classified into four types.

By the way of example but not limitation, the memory system may determine that a background operation is not required, and may transmit the first information 00h in response to host's inquiry. Referring to FIG. 8, the first information can correspond to the first level (GC Level 1) among the garbage collection levels (GC Levels). The first information 00h may be delivered to the host when the operating state of the memory device 150 is in a clean state.

The memory system may pass to the host the second information 01h indicating that a background operation is required but the memory device is not under a critical situation. Referring to FIG. 8, the second information may correspond to the second to fourth levels (GC Levels 2 to 4) among the garbage collection levels (GC Levels). When the operation state of the memory device 150 is in the clean state or the pre-urgent state, the second information 01h can be delivered as a response to the host.

Based on the operating state of the memory device, the memory system may pass to the host third information 02h showing that a background operation is required, and no background operation may deteriorate the performance of the memory system. Referring to FIG. 8, the third information may correspond to a fourth level or a fifth level (GC Level 4 or 5) among the garbage collection levels (GC Levels). When the operation state of the memory device is under the pre-urgent state or the urgent state, the third information 02h may be delivered to the host.

Corresponding to the operating state of the memory device 150, the memory system may deliver to the host fourth information 03h indicating that the memory device is under a serious situation in which normal operation may be a threat. Referring to FIG. 8, the third information may correspond to the fourth and fifth levels (GC Levels 4 and 5) among the garbage collection levels (GC Levels). When the operation state of the memory device 150 is in the pre-urgent state or the urgent state, the fourth information 03h may be transferred into the host.

Figure 10:
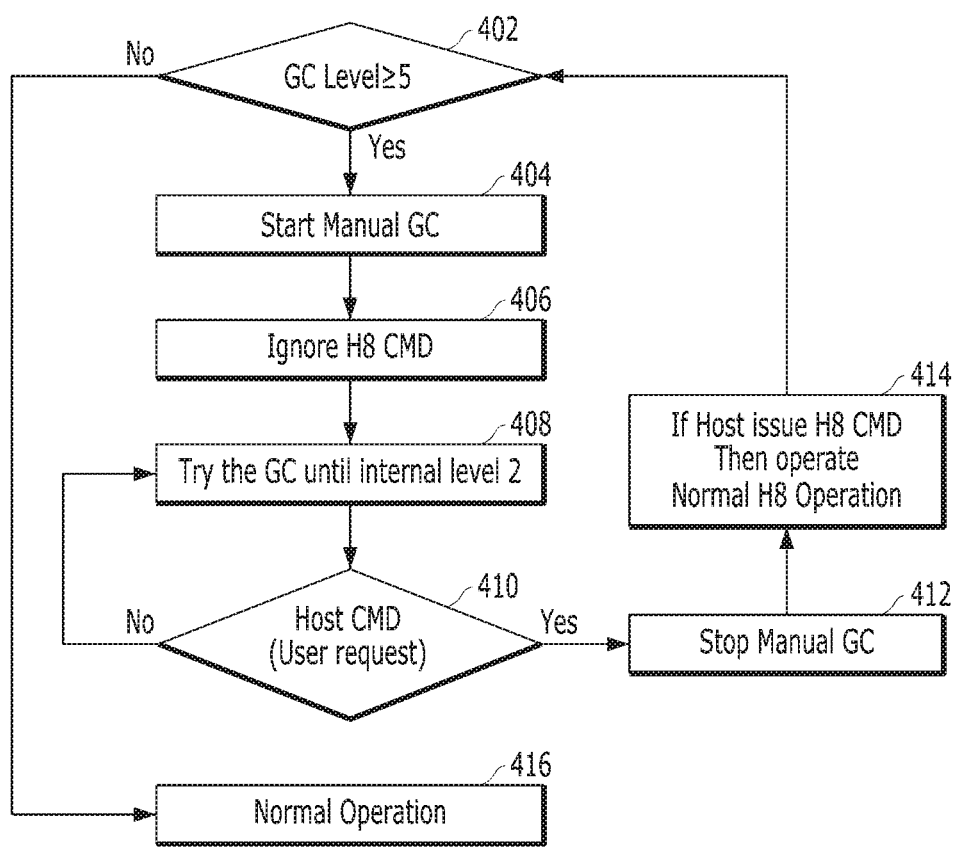
FIG. 10 is a flowchart illustrating a method for performing a manual garbage collection in accordance with an embodiment of the disclosure.

FIG. 10 describes how to carry out the manual garbage collection (Manual GC) in accordance with an embodiment of the disclosure.

In FIG. 10, a host may issue a manual garbage collection command to instruct the memory system to carry out a manual garbage collection (Manual GC). Unlike the auto garbage collection (Auto GC) described in FIGS. 5 to 7, the manual garbage collection (Manual GC) is not performed by the memory system without the manual garbage collection command. The memory system can carry out the manual garbage collection (Manual GC) only when the host instructs the memory system to perform the manual garbage collection (Manual GC). This is a difference between the auto garbage collection (Auto GC) and the manual garbage collection (Manual GC).

The manual garbage collection command for a manual garbage collection (Manual GC) may be issued after the host recognizes the operating state of the memory device in the memory system as described in FIG. 8.

Upon receipt of the manual garbage collection command generated by the host, the memory system may perform the manual garbage collection (Manual GC) in step 404.

While the memory system is performing the manual garbage collection, it can ignore hibernate or sleep commands (HIBERN8 or H8 CMD) entered thereafter from the host. The memory system can generally perform the power save operation (H8 Operation) in response to hibernate or sleep commands (HIBERN8 or H8 CMD). However, during the manual garbage collection Requested (GC), the power save operation (H8 Operation) may not be performed.

While performing the manual garbage collection (Manual GC), the memory system may check an operation state of the memory device. By the way of example but not limitation, regardless of what level the memory device has at the beginning of the manual garbage collection Requested (GC), the memory system may check whether the garbage collection level (GC) Level is shifted into the second level (GC Level 2) in step 408. That is, the memory system can check whether the garbage collection is carried out to sufficiently secure available storage capacity of the memory device.

In addition, the memory system may monitor whether a command Host CMD corresponding to a user request is entered from the host in step 410. Here, an example of host's command (Host CMD) corresponding to a user request is a SCSI command.

In accordance with an embodiment, the memory system may ignore a specific instruction while performing manual garbage collection (Manual GC) so that the memory system does not perform a power saving operation (H8 Operation) or the like until the manual garbage collection is completed. However, the memory system cannot ignore a write or read command for writing data into the memory device or reading data stored in a memory device while the manual garbage collection (Manual GC) is being performed.

In an embodiment, when the memory system receives a command Host CMD corresponding to user's request, the requested (GC) may cease in step 412.

When the host issue or generates a hibernate command or a sleep command (HIBERN8 or H8 CMD) after the manual garbage collection Requested (GC) is stopped, the memory system can perform a power saving operation (H8 Operation) in step 414. For example, in the power saving operation (H8 Operation), the high-impedance (High-Z) can be induced at terminals connected to the transmission line in the transceiver modules 514, 534 described in FIG. 1.

When the host does not issue a command to instruct the memory system to carry out the manual garbage collection Requested (GC), the memory system may perform a normal operation in step 416. Here, the normal operation of the memory system may include a power saving operation (H8 Operation) performed in response to host's hibernate or sleep command (HIBERN8 or H8 CMD).

Figure 11:
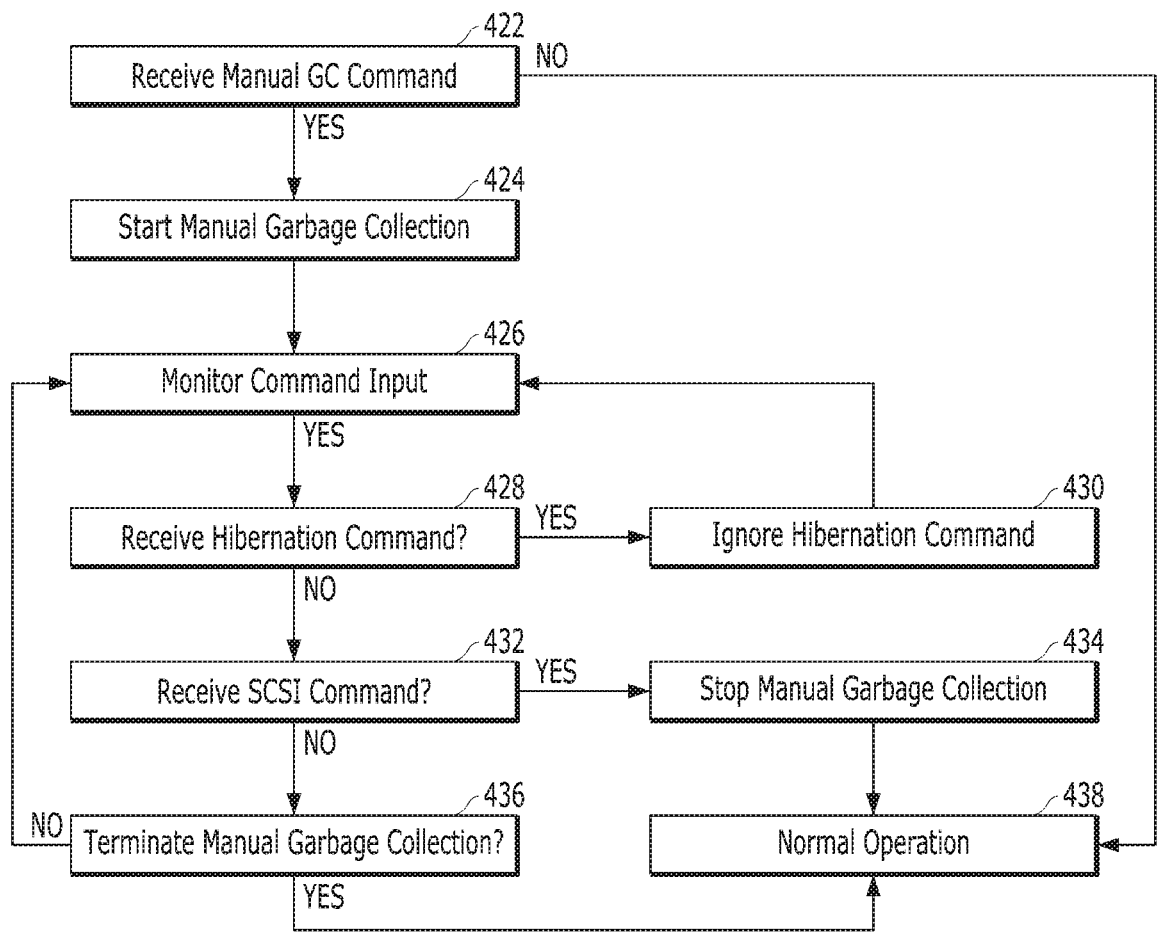
FIG. 11 is a flowchart illustrating a method for performing a manual garbage collection in accordance with an embodiment of the present invention.

Referring to FIG. 11, a method for performing a manual garbage collection Requested (GC) in accordance with another embodiment of the disclosure is disclosed. FIG. 11 shows a method including additional processes to the manual garbage collection (Manual GC) described in FIG. 10.

In FIG. 11, the memory system may receive a host's instruction (Manual GC) CMD for instructing the memory system to perform the manual garbage collection (Manual GC) in step 422. In response to the host's instruction (Manual GC) CMD for the manual garbage collection (Manual GC), the memory system may start the manual garbage collection (Manual GC) in step 424.

The memory system may monitor whether an instruction is delivered from the host in step 426. The memory system can check or confirm whether the command entered from the host is a hibernate command or a sleep command (HIBERN8 or H8 CMD) in step 428. When the command entered from the host is the hibernate command or the sleep command (HIBERN8 or H8 CMD), the memory system may ignore the entered command in step 430, because the memory system had started the manual garbage collection (Manual GC).

When the command entered from the host is not the hibernate command or the sleep command (HIBERN8 or H8 CMD), the memory system can check whether the command delivered from the host is a type of SCSI command in step 432. If the command entered from the host is a type of SCSI command, the memory system may stop the manual garbage collection (Manual GC) in step 434.

After the memory system stops the manual garbage collection (Manual GC), the memory system may perform a normal operation in response to the type of SCSI command in step 438.

When the command received by the memory system is not a type of SCSI command, the memory system may ignore the provided command and can check or determine whether the manual garbage collection (Manual GC) is completed in step 436. If the manual garbage collection (Manual GC) is not yet completed, the memory system keeps performing the manual garbage collection (Manual GC) while monitoring any command that is entered from the host as described with reference steps 426 to 438. When the manual garbage collection (Manual GC) is completed, the memory system can perform a normal operation in step 438.

Referring to FIG. 12, a method is shown for transmitting information regarding performance of the manual garbage collection Requested (GC) in the memory system. Specifically, FIGS. 12A and 12B illustrate different embodiments of informing the host of information indicating whether the memory system is performing the manual garbage collection (Manual GC). Further, FIG. 12C describes the standard issued by the Joint Electron for Devices Engineering Council (JEDEC) for Universal Flash Storage (UFS), which can be applicable for general flash memory systems.

Referring to FIG. 12C, the standard of the Joint Electron for Devices Engineering Council (JEDEC) for Universal Flash Storage (UFS) shows that a host may send an inquiry to a memory system, but there is no fixed format used by the memory system for a response to a host's inquiry. In an embodiment, the memory system may use a reserved signal for additional operations, as defined in the standard. In FIGS. 12A to 12C, two attributes 12h, 13h which are reserved in the standard may be used as a response by the memory system. However, a response signal may be different in accordance with an embodiment.

FIG. 12A describes how to inform the host of information regarding whether the memory system performs the manual garbage collection (Manual GC). The host and the memory system can set a signal of a predetermined format including some fields (e.g., attributes or identifiers) indicating whether the manual garbage collection (Manual GC) is being performed or the manual garbage collection (Manual GC) is required.

Referring to FIG. 12B, with respect to the manual garbage collection (MGC), the memory system can send one of four different responses to the host. A first response including attributes 12h, 13h both having a value of '0' can show that the manual garbage collection (MGC) is not needed. A second response including the attribute 12h having a value of '0' and the attribute 13h having a value of '1' represents that the manual garbage collection (MGC) is required but the host should issue the manual garbage collection command (CMD) for the manual garbage collection (MGC). A fourth response including the attributes 12h, 13h both having a value of '1' may indicate that the manual garbage collection is being performed in the memory system. Also, in accordance with an embodiment, the memory system may deliver to the host a third response including the attribute 12h having a value of '1' and the attribute 13h having a value of '0' showing that the manual garbage collection (MGC) is not performed currently.

Figure 13A:
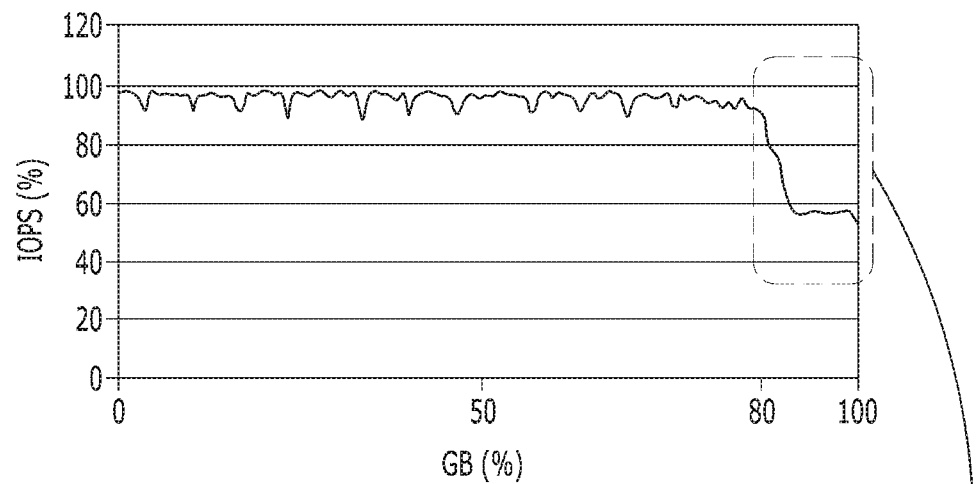
FIGS. 13A and 13B describes an effect of performing garbage collection in accordance with an embodiment of the disclosure.
Figure 13B:
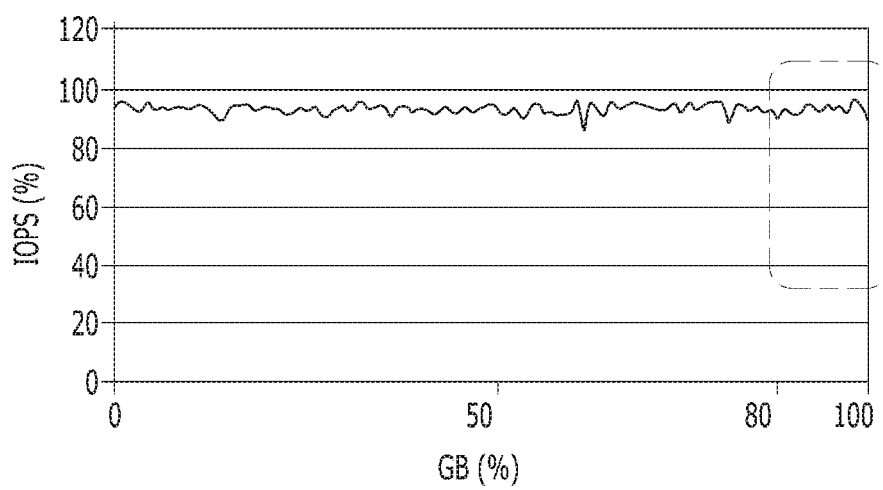

In FIG. 13, a control method for performing garbage collection according to an embodiment of the disclosure may improve performance of the memory system. Referring to FIGS. 13A and 13B, the x-axis represents a ratio (%) of user data occupying storage space to a whole storage space in the memory device and the y-axis represents results from inputs/outputs test (e.g., I/Os per second (IOPS) Test), which are described as a ratio (%).

For example, it can be assumed that a user data storage capacity is 110G while a total storage capacity in a memory system is 128G. The 110G area, in which user data can be recorded, may correspond to 100% of GB shown in FIG. 3. The memory system may include a remaining area which a user cannot access. The remaining area other than the storage capacity of 110G is an area in which system information such as metadata can be stored, and the user may not be able to store the data. In the inputs/outputs test (I/Os per second (IOPS) Test), 100% may be considered desirable performance in accordance with design and configuration of the memory system.

FIG. 13A illustrates performance of a memory system in which the manual garbage collection (Manual GC) is not performed while FIG. 13B shows performance of a memory system in which the manual garbage collection (Manual GC) is performed. Here, the performance of the memory system can be measured or estimated through an inputs/outputs test. The test can measure the random IO performance covering a broad range of Read/Write (R/W) operations and block size combinations. Here, the result of 100% in the input/output test is ideal or the target value. FIG. 13 shows how close test results of two different memory system are to the target value (e.g., whether the memory system may achieve desired performance).

Referring to FIG. 13A, after data has been recorded in about 75% to 80% of the storage space of 100% (for example, when data is recorded in a space of 90G or 95G out of 110G), it may be seen that the performance of the memory system deteriorates drastically when the occupation of the user data becomes near the whole storage space. As not shown, performance drop of a memory system having different storage space may occur at different occupation of the user data.

Referring to FIG. 13B, in a memory system in which the manual garbage collection (Manual GC) is performed, the performance deterioration of the memory system can be avoided in the process of recording or accessing data in about 75% to 80% of the whole storage space.

Embodiments can provide the memory system to determine its operation state by itself, to ignore a specific command transmitted or entered from the host in the course of performing a garbage collection, and to place the memory device in a clean state through the garbage collection.

In addition, embodiments can allow the memory system to determine its operating state and deliver the operating state to a host. While performing a garbage collection, the memory system can ignore some commands for reducing its power consumption, which are entered from a host. Embodiments can avert some host's commands to prevent that the garbage collection is interrupted by some commands entered from a host, so that deterioration in performance of the memory system can be avoided.

While the disclosure has been described with respect to the specific embodiments, it will be apparent to those skilled in the art that various changes and modifications may be made without departing from the spirit and scope of the invention as defined in the following claims.

What is claimed is:

1. A memory system comprising:
a memory device including erasable memory blocks suitable for storing data, wherein an operation state of the memory device is determined based on an available storage capacity of the memory device; and
a controller suitable for determining the operation state of the memory device according to a predetermined ratio of data usage throughout a storage capacity of the memory device and carrying out garbage collection to the memory device, wherein the predetermined ratio is changed according to a requirement from a host engaged with the memory system, and
wherein the controller performs the garbage collection to at least one erasable memory block based on a background enable command input from a host, receives a command from the host while the controller carries out the garbage collection, and determines whether the command is a first command for reducing power consumption of the memory system,
wherein, when the command is the first command, the controller a) ignores the first command when a usage level of the erasable memory blocks subject to the garbage collection exceeds a threshold, and b) performs the garbage collection until the usage level is changed from a second status indicating that the garbage collection is required to a first status indicating the garbage collection is not required, and
wherein the controller ignoring the first command when the usage level exceeds the threshold avoids a dead state of the erasable memory block where there are no free memory blocks for the garbage collection.

2. The memory system according to claim 1, wherein the data usage is determined based on a classified range regarding a ratio of an amount of both the valid data and the invalid data stored in the memory device to the storage capacity of the memory device.

3. The memory system according to claim 2, wherein the classified range can be determined based on the storage capacity of the memory device.

4. The memory system according to claim 1, wherein the controller:
transmits information regarding the operating state to the host;
receives a third command for performing the garbage collection from the host, and
performs the garbage collection in response to the third command.

5. The memory system according to claim 1,
wherein the controller transmits information of one among at least three statuses to the host, and
wherein the at least three statuses include:
the first status;
the second status; and
a third status indicating that the garbage collection is being performed.

6. The memory system according to claim 1, wherein the controller:
transmits information of the operation state to the host; and
starts the garbage collection without any command entered from the host.

7. The memory system according to claim 1, wherein the available storage capacity is determined based on how much recorded data including valid data and invalid data occupies in the entire storage capacity of the memory device.

8. The memory system according to claim 7, wherein the first command is ignored when the available storage capacity is less than 20% of the entire storage capacity of the memory device.

9. The memory system according to claim 1, wherein the controller determines whether the command is a second command for performing a read, write, program or erase operation of the memory device, the second command including a Small Computer System Interface (SCSI) command.

10. The memory system according to claim 9, wherein, when the command is the second command, the controller halts the garbage collection and performs the read, write, program or erase operation.

11. The memory system according to claim 1, wherein the operation state is determined as one among a clean state, a dead state, a pre-urgent state, and an urgent state.

12. A method for operating a memory system, comprising:
determining an operation state of a memory device including erasable memory blocks suitable for storing data, wherein the operation state of the memory device is determined according to a predetermined ratio of data usage through a storage capacity of the memory device, wherein the predetermined ratio is changed according to a requirement from a host engaged with the memory system; and
carrying out garbage collection to at least one erasable memory block of the memory device based on a background enable command input from a host;
receiving a command from the host while the garbage collection is carried out,
determining whether the command is a first command for reducing power consumption of the memory system; and
ignoring, when the command is the first command, the first command when a usage level of the erasable memory blocks subject to the garbage collection exceeds a threshold, and performing the garbage collection until the usage level is changed from a second status indicating that the garbage collection is required to a first status indicating the garbage collection is not required,
wherein the ignoring the first command when the usage level exceeds the threshold is for avoiding a dead state of the erasable memory block where there are no free memory blocks for the garbage collection.

13. The method according to claim 12, further comprising:
determining the operation state based on the usage level against a storage capacity of the memory device;
transmitting information about the operating state to the host; and
receiving a third command for performing the garbage collection from the host, and
wherein the garbage collection is performed in response to the third command.

14. The method according to claim 13,
wherein the transmitting includes transmitting information of one among at least three statuses to the host, and
wherein the at least three statuses include:
the first status;
the second status; and
a third status indicating that the garbage collection is being performed.

15. The method according to claim 12, wherein the garbage collection is begun regardless of any command entered from the host.

16. The method according to claim 12, further comprising:
    determining whether the command is a second command for performing a read, write, program or erase operation of the memory device, the second command including a Small Computer System Interface (SCSI) command.

17. The method according to claim 16, further comprising:
    when the command is the second command, halting the garbage collection and performing the read, write, program or erase operation.

18. The method according to claim 12, wherein the operation state is determined as one among a clean state, a dead state, a pre-urgent state, and an urgent state.

19. A system comprising:
    at least one processor; and
    at least one memory including program instructions,
    wherein the at least one memory and the program instructions are configured to, with the at least one processor, cause the system to:
    determine an operation state of a memory device including erasable memory blocks suitable for storing data, wherein the operation state of the memory device is determined according to a predetermined ratio of data usage through a storage capacity of the memory device, wherein the predetermined ratio is changed according to a requirement from a host engaged with the memory system,
    perform garbage collection to at least one erasable memory block of the memory device based on a background enable command input from a host,
    receive a command from the host while the garbage collection is carried out,
    determine whether the command is a first command for reducing power consumption of the memory system, and
    when the command is the first command, ignore the first command when a usage level of the erasable memory blocks subject to the garbage collection exceeds a threshold, and perform the garbage collection until the usage level is changed from a second status indicating that the garbage collection is required to a first status indicating the garbage collection is not required,
    wherein the system ignoring the first command when the usage level exceeds the threshold avoids a dead state of the erasable memory block where there are no free memory blocks for the garbage collection.

20. The system according to claim 19, wherein the at least one memory and the program instructions are further configured to, with the at least one processor, cause the system to:
    determine whether the command is a second command for performing a read, write, program or erase operation of the memory device, the second command including a Small Computer System Interface (SCSI) command; and
    when the command is the second command, halt the garbage collection and perform the read, write, program or erase operation.

* * * * *